US011478923B2

(12) United States Patent
Wagner et al.

(10) Patent No.: US 11,478,923 B2
(45) Date of Patent: *Oct. 25, 2022

(54) SYSTEMS AND METHODS FOR PROCESSING OBJECTS INCLUDING A ZONE GANTRY SYSTEM

(71) Applicant: Berkshire Grey Operating Company, Inc., Bedford, MA (US)

(72) Inventors: Thomas Wagner, Concord, MA (US); Kevin Ahearn, Nebo, NC (US); John Richard Amend, Jr., Belmont, MA (US); Benjamin Cohen, Somerville, MA (US); Michael Dawson-Haggerty, Pittsburgh, PA (US); William Hartman Fort, Stratham, NH (US); Christopher Geyer, Arlington, MA (US); Jennifer Eileen King, Oakmont, PA (US); Thomas Koletschka, Cambridge, MA (US); Michael Cap Koval, Mountain View, CA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 303 days.

This patent is subject to a terminal disclaimer.

(21) Appl. No.: 16/808,600

(22) Filed: Mar. 4, 2020

(65) Prior Publication Data

US 2020/0198124 A1   Jun. 25, 2020

Related U.S. Application Data

(63) Continuation of application No. 15/925,409, filed on Mar. 19, 2018, now Pat. No. 10,632,610.

(Continued)

(51) Int. Cl.
*B25J 9/02* (2006.01)
*B25J 9/00* (2006.01)
(Continued)

(52) U.S. Cl.
CPC ............ *B25J 9/026* (2013.01); *B25J 9/0093* (2013.01); *B25J 9/1615* (2013.01);
(Continued)

(58) Field of Classification Search
CPC ........ B25J 9/026; B25J 9/0093; B25J 9/1615; B65G 1/0464; B65G 1/1373;
(Continued)

(56) References Cited

U.S. PATENT DOCUMENTS 4,678,390 A    7/1987 Bonneton et al.
4,722,653 A    2/1988 Williams et al.
(Continued)

FOREIGN PATENT DOCUMENTS

AU    2006204622 A1    3/2007
CA       2795022 A1   10/2011
(Continued)

OTHER PUBLICATIONS

International Search Report and Written Opinion issued by the International Searching Authority in related International Application No. PCT/US2018/023163, dated Jul. 4, 2018, 15 pages.
(Continued)

*Primary Examiner* — Thomas Randazzo
(74) *Attorney, Agent, or Firm* — Gesmer Updegrove LLP

(57) ABSTRACT

A storage, retrieval and processing system for processing objects is disclosed. The storage, retrieval and processing system includes a plurality of storage bins, a plurality of destination bins, and a processing programmable motion device. The plurality of storage bins provides storage of a
(Continued)

plurality of objects, where the plurality of storage bins are in communication with a gantry retrieval conveyance system for moving selected bins to a bin processing location. The plurality of destination bins are in communication with the gantry retrieval conveyance system for moving a selected destination bin to the processing location. The processing programmable motion device is at the processing location and is in communication with the gantry retrieval conveyance system. The processing programmable motion device includes an end effector for grasping and moving a selected object out of a selected storage bin and depositing the selected object in the selected destination bin.

32 Claims, 11 Drawing Sheets

Related U.S. Application Data

(60) Provisional application No. 62/473,857, filed on Mar. 20, 2017.

(51) Int. Cl.
  *B25J 9/16*    (2006.01)
  *B65G 1/04*    (2006.01)
  *B65G 1/137*   (2006.01)
  *B65G 47/91*   (2006.01)
  *G06Q 10/08*   (2012.01)

(52) U.S. Cl.
  CPC ......... *B65G 1/0464* (2013.01); *B65G 1/1373* (2013.01); *B65G 47/917* (2013.01); *G06Q 10/087* (2013.01); *B65G 1/0485* (2013.01); *B65G 1/1378* (2013.01); *B65G 2201/0258* (2013.01)

(58) Field of Classification Search
  CPC ................ B65G 47/917; B65G 1/0485; B65G 1/1378; B65G 2201/0258; G06Q 10/087
  See application file for complete search history.

(56) References Cited

U.S. PATENT DOCUMENTS

| | | | |
|---|---|---|---|
| 4,759,439 A | 7/1988 | Hartlepp | |
| 4,819,784 A | 4/1989 | Sticht | |
| 4,846,335 A | 7/1989 | Hartlepp | |
| 4,895,242 A | 1/1990 | Michel | |
| 5,190,162 A | 3/1993 | Hartlepp | |
| 5,419,457 A | 5/1995 | Ross et al. | |
| 5,595,263 A | 1/1997 | Pignataro | |
| 5,839,566 A | 11/1998 | Bonnet | |
| 6,011,998 A | 1/2000 | Lichti et al. | |
| 6,036,812 A | 3/2000 | Williams et al. | |
| 6,059,092 A | 5/2000 | Jerue et al. | |
| 6,079,570 A | 6/2000 | Oppliger et al. | |
| 6,246,023 B1 | 6/2001 | Kugle | |
| 6,323,452 B1 | 11/2001 | Bonnet | |
| 6,377,867 B1 | 4/2002 | Bradley et al. | |
| 6,390,756 B1 | 5/2002 | Isaacs et al. | |
| 6,505,093 B1 | 1/2003 | Thatcher et al. | |
| 6,579,053 B1 | 6/2003 | Grams et al. | |
| 6,685,031 B2 | 2/2004 | Takizawa | |
| 6,688,459 B1 | 2/2004 | Bonham et al. | |
| 6,762,382 B1 | 7/2004 | Danelski | |
| 6,897,395 B2 | 5/2005 | Shiibashi et al. | |
| 6,946,612 B2 | 9/2005 | Morikawa | |
| 7,728,244 B2 | 6/2010 | De Leo et al. | |
| 9,020,632 B2 | 4/2015 | Naylor | |
| 9,102,336 B2 | 8/2015 | Rosenwinkel | |
| 9,120,622 B1 | 9/2015 | Elazary et al. | |
| 9,272,845 B2 * | 3/2016 | Honkanen | B65G 1/0421 |
| 9,481,518 B2 | 11/2016 | Neiser | |
| 9,694,977 B2 | 7/2017 | Aprea et al. | |
| 9,751,693 B1 * | 9/2017 | Battles | B25J 9/0084 |
| 9,821,464 B2 | 11/2017 | Stiernagle et al. | |
| 9,878,349 B2 | 1/2018 | Crest et al. | |
| 9,926,138 B1 | 3/2018 | Brazeau et al. | |
| 9,962,743 B2 | 5/2018 | Bombaugh et al. | |
| 9,975,148 B2 | 5/2018 | Zhu et al. | |
| 10,029,865 B1 | 7/2018 | McCalib, Jr. et al. | |
| 10,058,896 B2 | 8/2018 | Hicham et al. | |
| 10,127,514 B2 | 11/2018 | Napoli | |
| 10,137,566 B2 | 11/2018 | Bastian, II et al. | |
| 10,138,062 B2 | 11/2018 | High et al. | |
| 10,632,610 B2 * | 4/2020 | Wagner | B65G 47/917 |
| 2001/0038784 A1 * | 11/2001 | Peltomaki | B65G 1/0464 |
| | | | 414/273 |
| 2002/0092801 A1 * | 7/2002 | Dominguez | B07C 5/3412 |
| | | | 209/583 |
| 2002/0157919 A1 | 10/2002 | Sherwin | |
| 2002/0179502 A1 | 12/2002 | Cerutti et al. | |
| 2003/0075051 A1 | 4/2003 | Watanabe et al. | |
| 2005/0002772 A1 | 1/2005 | Stone | |
| 2005/0149226 A1 | 7/2005 | Stevens et al. | |
| 2005/0220600 A1 * | 10/2005 | Baker | B65G 1/04 |
| | | | 414/626 |
| 2008/0046116 A1 | 2/2008 | Khan et al. | |
| 2008/0181753 A1 | 7/2008 | Bastian et al. | |
| 2009/0047178 A1 | 2/2009 | Chojnacki et al. | |
| 2010/0318216 A1 | 12/2010 | Faivre et al. | |
| 2011/0238207 A1 | 9/2011 | Bastian II et al. | |
| 2011/0243707 A1 | 10/2011 | Dumas et al. | |
| 2012/0118699 A1 | 5/2012 | Buchmann et al. | |
| 2012/0219397 A1 * | 8/2012 | Baker | B65G 1/1373 |
| | | | 414/796 |
| 2012/0328397 A1 | 12/2012 | Yamashita | |
| 2013/0110280 A1 * | 5/2013 | Folk | B25J 15/0057 |
| | | | 700/215 |
| 2014/0086709 A1 | 3/2014 | Kasai | |
| 2014/0086714 A1 | 3/2014 | Mauk | |
| 2014/0244026 A1 * | 8/2014 | Neiser | B65G 1/1378 |
| | | | 700/216 |
| 2014/0277693 A1 | 9/2014 | Naylor | |
| 2015/0098775 A1 | 4/2015 | Razumov | |
| 2015/0114799 A1 | 4/2015 | Hansl et al. | |
| 2015/0203297 A1 | 7/2015 | Manning et al. | |
| 2016/0107848 A1 * | 4/2016 | Baker | B65G 61/00 |
| | | | 414/788.8 |
| 2016/0167227 A1 | 6/2016 | Wellman et al. | |
| 2016/0176638 A1 * | 6/2016 | Toebes | G05D 1/0212 |
| | | | 701/25 |
| 2016/0199884 A1 | 7/2016 | Lykkegaard et al. | |
| 2016/0221187 A1 | 8/2016 | Bradski et al. | |
| 2016/0221762 A1 | 8/2016 | Schroader | |
| 2016/0244262 A1 | 8/2016 | O'Brien et al. | |
| 2016/0325934 A1 | 11/2016 | Stiernagle et al. | |
| 2016/0347545 A1 * | 12/2016 | Lindbo | B65G 1/1378 |
| 2017/0121114 A1 | 5/2017 | Einav et al. | |
| 2017/0136632 A1 | 5/2017 | Wagner et al. | |
| 2017/0157648 A1 | 6/2017 | Wagner et al. | |
| 2017/0225330 A1 | 8/2017 | Wagner et al. | |
| 2017/0267469 A1 * | 9/2017 | Miyoshi | B65G 1/04 |
| 2017/0322561 A1 | 11/2017 | Stiernagle | |
| 2017/0349385 A1 | 12/2017 | Moroni et al. | |
| 2018/0085788 A1 | 3/2018 | Engel et al. | |
| 2018/0186572 A1 | 7/2018 | Issing | |
| 2018/0244473 A1 | 8/2018 | Mathi et al. | |
| 2018/0265291 A1 | 9/2018 | Wagner et al. | |
| 2018/0265298 A1 | 9/2018 | Wagner et al. | |
| 2018/0265311 A1 | 9/2018 | Wagner et al. | |
| 2018/0273295 A1 | 9/2018 | Wagner et al. | |
| 2018/0273296 A1 | 9/2018 | Wagner et al. | |
| 2018/0273297 A1 | 9/2018 | Wagner et al. | |
| 2018/0273298 A1 | 9/2018 | Wagner et al. | |
| 2018/0282065 A1 | 10/2018 | Wagner et al. | |
| 2018/0282066 A1 | 10/2018 | Wagner et al. | |
| 2018/0327198 A1 | 11/2018 | Wagner et al. | |
| 2018/0330134 A1 | 11/2018 | Wagner et al. | |
| 2019/0022702 A1 | 1/2019 | Vegh et al. | |

(56) References Cited

U.S. PATENT DOCUMENTS

| | | | |
|---|---|---|---|
| 2019/0047786 A1 | 2/2019 | Suzuki | |
| 2019/0102712 A1* | 4/2019 | Duca | B66C 13/46 |
| 2019/0329979 A1 | 10/2019 | Wicks et al. | |

FOREIGN PATENT DOCUMENTS

| | | | | |
|---|---|---|---|---|
| CA | 2985166 A1 | 12/2016 | | |
| CN | 102390701 A | 3/2012 | | |
| CN | 105377721 A | 3/2016 | | |
| CN | 106395225 A | 2/2017 | | |
| DE | 957200 C | 1/1957 | | |
| DE | 3810989 A1 | 8/1989 | | |
| DE | 19510392 A1 | 9/1996 | | |
| DE | 20011842 U1 | 3/2001 | | |
| DE | 102004001181 A1 | 8/2005 | | |
| DE | 102005061309 A1 | 7/2007 | | |
| DE | 102006057658 A1 | 6/2008 | | |
| DE | 102007023909 A1 | 11/2008 | | |
| DE | 102007038834 A1 | 2/2009 | | |
| DE | 102007054867 A1 | 5/2009 | | |
| DE | 102008039764 A1 | 5/2010 | | |
| DE | 102009023808 A1 | 12/2010 | | |
| DE | 102010002317 A1 | 8/2011 | | |
| DE | 102011115951 A1 | 4/2013 | | |
| DE | 102012102333 A1 | 9/2013 | | |
| DE | 102014111396 A1 | 2/2016 | | |
| EP | 0235488 A1 | 9/1987 | | |
| EP | 0767113 A2 | 4/1997 | | |
| EP | 1671906 A1 | 6/2006 | | |
| EP | 1695927 A2 | 8/2006 | | |
| EP | 1995192 A2 | 11/2008 | | |
| EP | 2233400 A1 | 9/2010 | | |
| EP | 2650237 A1 | 10/2013 | | |
| EP | 2650237 A1 * | 10/2013 | | B65G 1/1378 |
| EP | 2823899 A1 | 1/2015 | | |
| EP | 2937299 A1 * | 10/2015 | | B65G 1/0464 |
| EP | 2937299 A1 | 10/2015 | | |
| EP | 3112295 A1 | 1/2017 | | |
| FR | 2036682 A1 | 12/1970 | | |
| FR | 2832654 A1 | 5/2003 | | |
| JP | S54131278 A | 10/1979 | | |
| JP | S63310406 A | 12/1988 | | |
| JP | H0395001 A | 4/1991 | | |
| JP | H0776404 A | 3/1995 | | |
| JP | H08157016 A | 6/1996 | | |
| JP | 2002028577 A | 1/2002 | | |
| JP | 2007182286 A | 7/2007 | | |
| JP | 2008037567 A | 2/2008 | | |
| JP | 2014141313 A | 8/2014 | | |
| NO | 20150758 A1 | 12/2016 | | |
| WO | 3074201 A1 | 9/2003 | | |
| WO | 03095339 A1 | 11/2003 | | |
| WO | 2005118436 A1 | 12/2005 | | |
| WO | 2007007354 A1 | 1/2007 | | |
| WO | 2007009136 A1 | 1/2007 | | |
| WO | 2008091733 A2 | 7/2008 | | |
| WO | 2010017872 A1 | 2/2010 | | |
| WO | 2010099873 A1 | 9/2010 | | |
| WO | 2011038442 A2 | 4/2011 | | |
| WO | 2011128384 A1 | 10/2011 | | |
| WO | 2012024714 A2 | 3/2012 | | |
| WO | 2012127102 A1 | 9/2012 | | |
| WO | 2014166650 A1 | 10/2014 | | |
| WO | 2015118171 A1 | 8/2015 | | |
| WO | 2016198565 A1 | 12/2016 | | |
| WO | 2017036780 A1 | 3/2017 | | |
| WO | 2017044747 A1 | 3/2017 | | |
| WO | 2017064401 A1 | 4/2017 | | |
| WO | 2017081281 A1 | 5/2017 | | |
| WO | 2017150006 A | 9/2017 | | |
| WO | 2018017616 A1 | 1/2018 | | |
| WO | 2018176033 A1 | 9/2018 | | |

OTHER PUBLICATIONS

International Preliminary Report on Patentability issued by the International Bureau of WIPO dated Sep. 24, 2019 in related International Application No. PCT/US2018/023163, 10 pages.

Communication pursuant to Rules 161(1) and 162 EPC issued by the European Patnet Office dated Oct. 29, 2019, in related European Patent Application No. 18716432.2, 3 pages.

Non-Final Office Action issued by the U.S. Patent and Trademark Office dated Mar. 15, 2019, in related U.S. Appl. No. 15/925,409, 21 pages.

Examiner's Report issued by the Innovation, Science and Economic Development Canada in related Canadian Patent Application No. 3,056,782 dated Nov. 10, 2020, 4 pages.

First Office Action, and its English translation, issued by the National Intellectual Property Administration, P.R.C. in related Chinese Patent Application No. 201880019729.X dated Aug. 20, 2020, 23 pages.

Examiner's Report issued by the Innovation, Science and Economic Development Canada in related Canadian Patent Application No. 3,056,782 dated Dec. 14, 2021, 3 pages.

* cited by examiner

SYSTEMS AND METHODS FOR PROCESSING OBJECTS INCLUDING A ZONE GANTRY SYSTEM

PRIORITY

The present application is a continuation of U.S. patent application Ser. No. 15/925,409, filed Mar. 19, 2018, which claims priority to U.S. Provisional Patent Application Ser. No. 62/473,857, filed Mar. 20, 2017, the disclosures of which are hereby incorporated by reference in their entireties.

BACKGROUND

The invention generally relates to storage and retrieval systems, and relates in particular to automated storage and retrieval systems that are used with systems for processing objects.

Automated storage and retrieval systems (AS/RS) generally include computer controlled systems for automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these traditional systems, the totes are brought to a person, and the person may either remove an item from the tote or add an item to the tote. The tote is then returned to the storage location. Such systems, for example, may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods.

There are limits however, on such conventional systems in terms of the time and resources required to move totes toward and then away from each person, as well as how quickly a person can process totes in this fashion in applications where each person may be required to process a large number of totes. There remains a need therefore, for an AS/RS that stores and retrieves objects more efficiently and cost effectively, yet also assists in the processing of a wide variety of objects.

SUMMARY

In accordance with an embodiment, the invention provides a storage, retrieval and processing system for processing objects. The storage, retrieval and processing system includes a plurality of storage bins, a plurality of destination bins, and a processing programmable motion device. The plurality of storage bins provides storage of a plurality of objects, where the plurality of storage bins are in communication with a gantry retrieval conveyance system for moving selected bins to a bin processing location. The plurality of destination bins are in communication with the gantry retrieval conveyance system for moving a selected destination bin to the processing location. The processing programmable motion device is at the processing location and is in communication with the gantry retrieval conveyance system. The processing programmable motion device includes an end effector for grasping and moving a selected object out of a selected storage bin and depositing the selected object in the selected destination bin.

In accordance with another embodiment, the invention provides a storage, retrieval and processing system for processing objects. The storage, retrieval and processing system includes plurality of storage bins providing storage of a plurality of objects, where the plurality of storage bins being in communication with a gantry retrieval conveyance system for moving selected storage bins to a storage bin processing location, a processing programmable motion device in communication with the storage bin processing location for receiving a selected storage bin from the plurality of bins, where the processing programmable motion device including an end effector for grasping and moving a selected object out of a selected storage bin, and a plurality of destination bins in communication with a destination conveyance system for moving a selected destination bin from a destination bin processing location that is proximate the processing programmable motion device.

In accordance with a further embodiment, the invention provides a method of providing storage, retrieval and processing of objects. The method includes the steps of providing a plurality of storage bins for storing a plurality of objects, where the plurality of storage bins being in communication with a gantry retrieval conveyance system, receiving a storage bin from the plurality of storage bins proximate a programmable motion device in communication with the retrieval conveyance system, receiving a selected destination bin from a plurality of destination bins, grasping and moving a selected object out of the selected storage bin, receiving the selected object from the programmable motion device, and carrying the selected object to the selected destination bin.

BRIEF DESCRIPTION OF THE DRAWINGS

The following description may be further understood with reference to the accompanying drawings in which.

The drawings are shown for illustrative purposes only.

DETAILED DESCRIPTION

In accordance with an embodiment, the invention provides a processing system for processing objects. The processing system includes a plurality of storage bins providing storage of a plurality of objects, a processing programmable motion device, and a plurality of destination bins. The plurality of storage bins are in communication with a storage bin retrieval conveyance system for moving selected storage bins to a storage bin processing location. The processing programmable motion device is in communication with the storage bin processing location for receiving a selected storage bin from the plurality of bins, and the processing programmable motion device includes an end effector for grasping and moving a selected object out of a selected storage bin. The plurality of destination bins is in communication with a destination conveyance system for moving a selected destination bin from a destination bin processing location that is proximate the processing programmable motion device to the plurality of destination bins.

Figure 1:
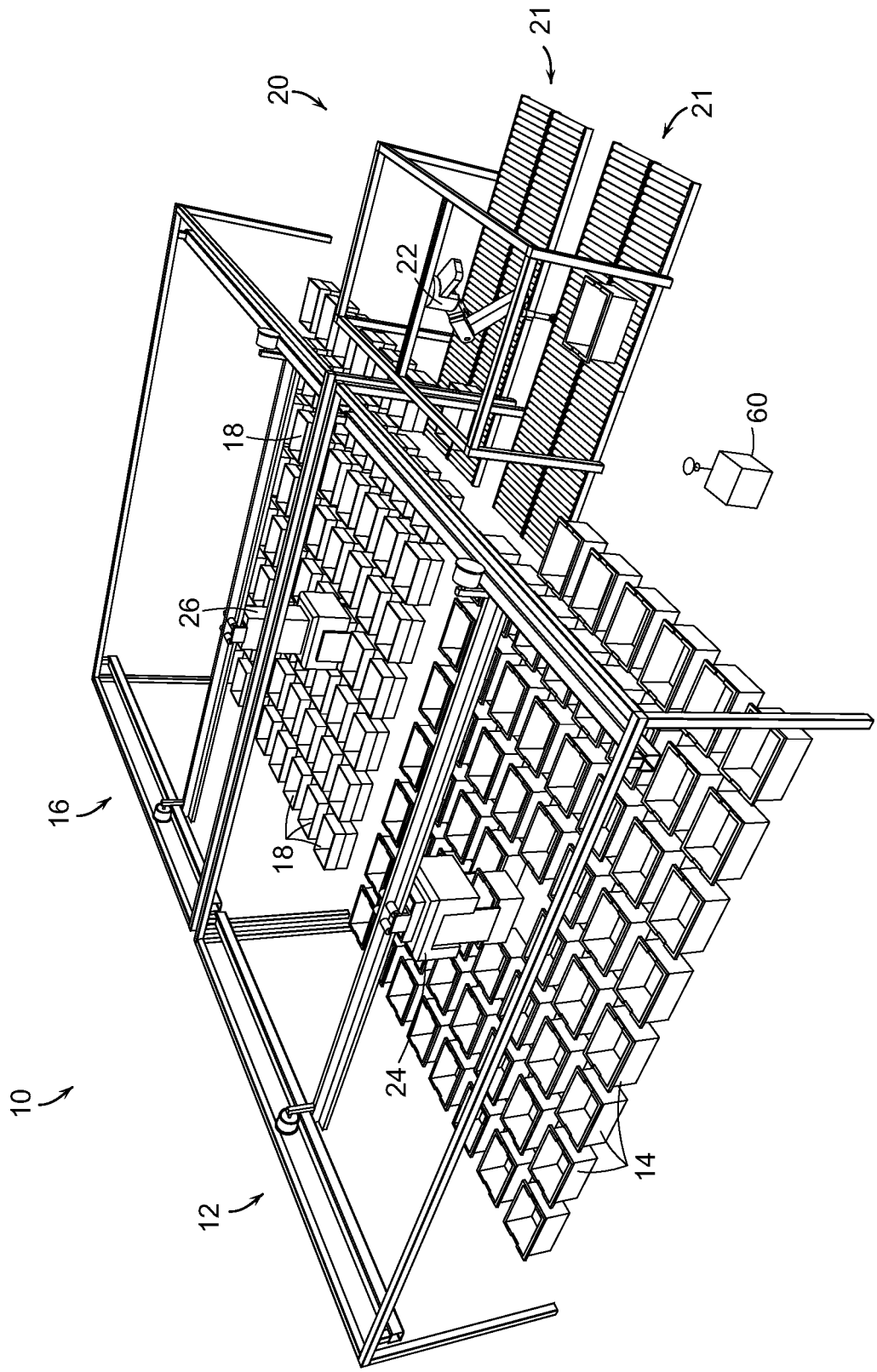
FIG. 1 shows an illustrative diagrammatic view of a storage, retrieval and processing system in accordance with an embodiment of the present invention.

With reference to FIG. 1, a system 10 of an embodiment of the present invention includes storage section 12 for storing a plurality of storage bins 14, a destination section 16 for maintaining a plurality of destination bins 18, and a processing section 20 that includes a programmable motion device 22. The storage section also includes a storage programmable motion device 24 for moving storage bins 14 to and from the processing station 20, and the destination section includes a destination programmable motion device 26 for moving destination bins to and from the processing section 20. In particular, the devices 24, 26 may bring bins to and retrieve bins from conveyors 21 that feed bins to and from the programmable motion device 22. Generally, one or a small number of storage bins 14 are provided to the processing section 20, and one or a small number of destination bins 18 are provided to the processing section 20.

The processing programmable motion device 22 (e.g., a robotic articulated arm) then distributes objects from the retrieved storage bins to the retrieved destination bins. The programmable motion device 20 is programmed to retrieve objects from the selected storage bin(s), and provide them to destination bins 22 in accordance with a manifest. Following processing, the returned storage bin(s) may be returned anywhere in the storage section as long as the system knows where each bin has been returned, and the returned destination bin(s) may be returned anywhere in the storage section as long as the system knows where each bin has been returned. The bins may be provided as boxes, totes, containers or any other type of device that may receive and hold an item.

Figure 2:
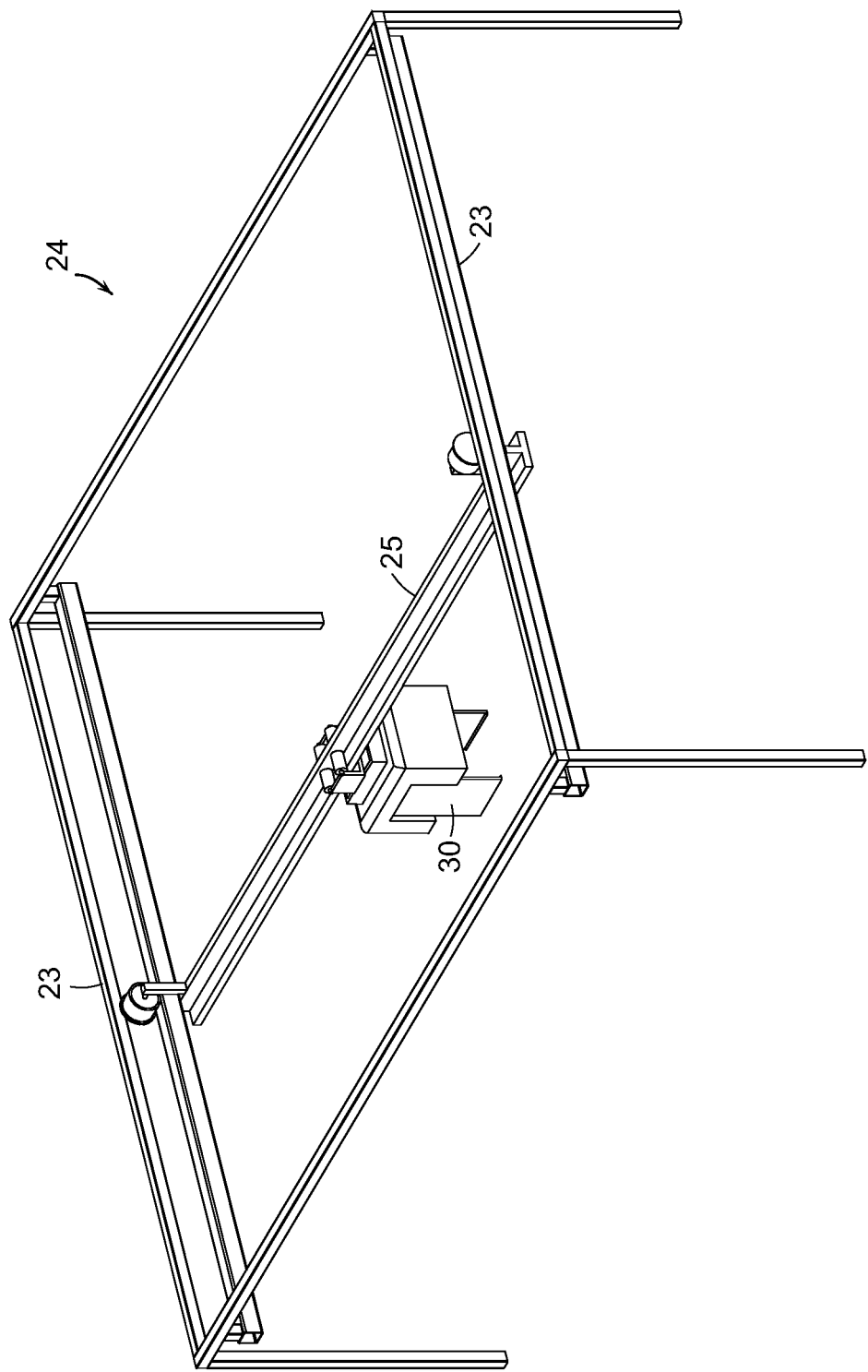
FIG. 2 shows an illustrative diagrammatic view of bin retrieval system for use in the storage, retrieval and processing system of FIG. 1.
Figure 3A:
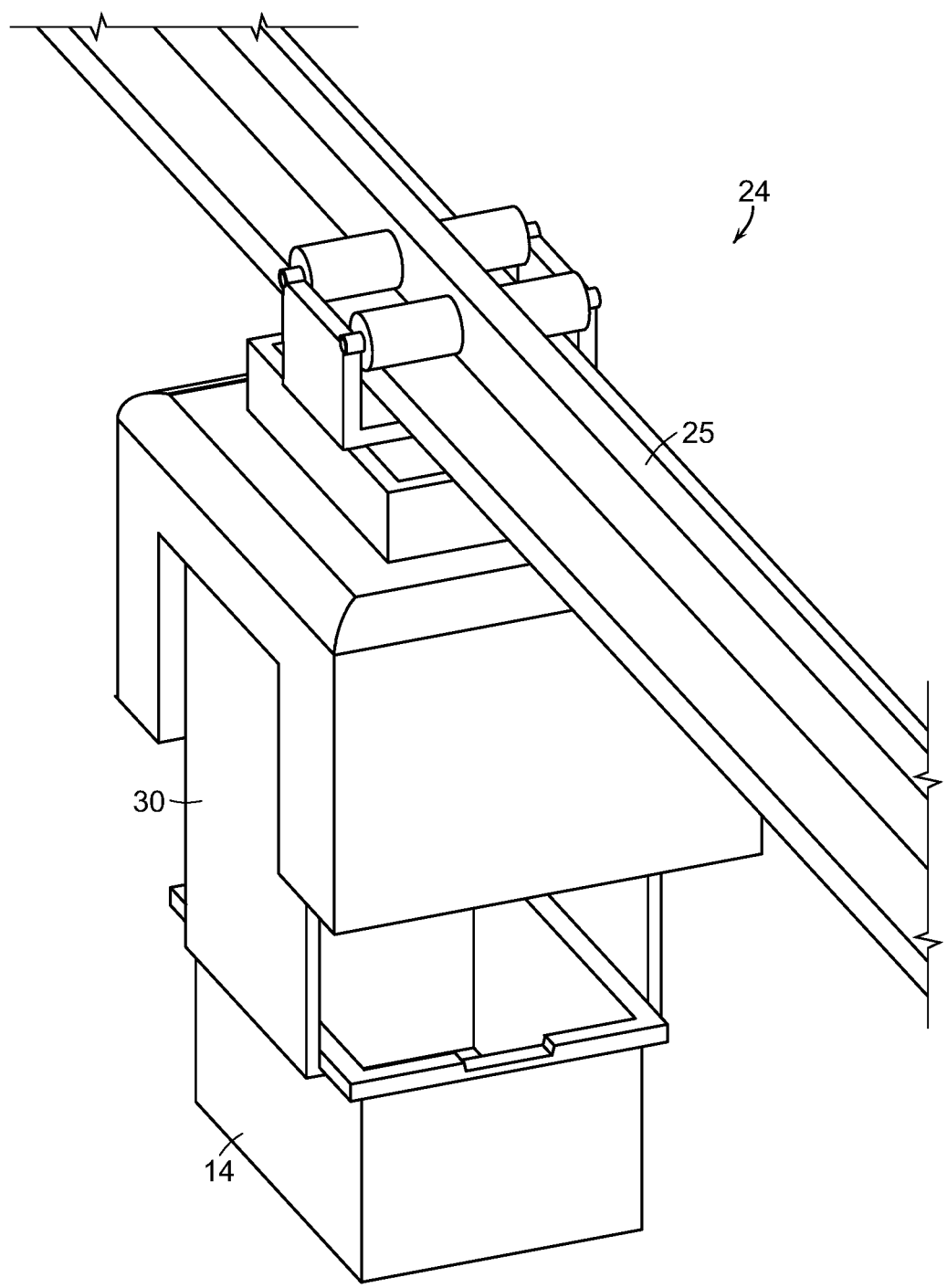
FIGS. 3A and 3B show illustrative diagrammatic views of grasping mechanisms for use in the retrieval system of FIG. 2 for grasping different types of bins.
Figure 3B:
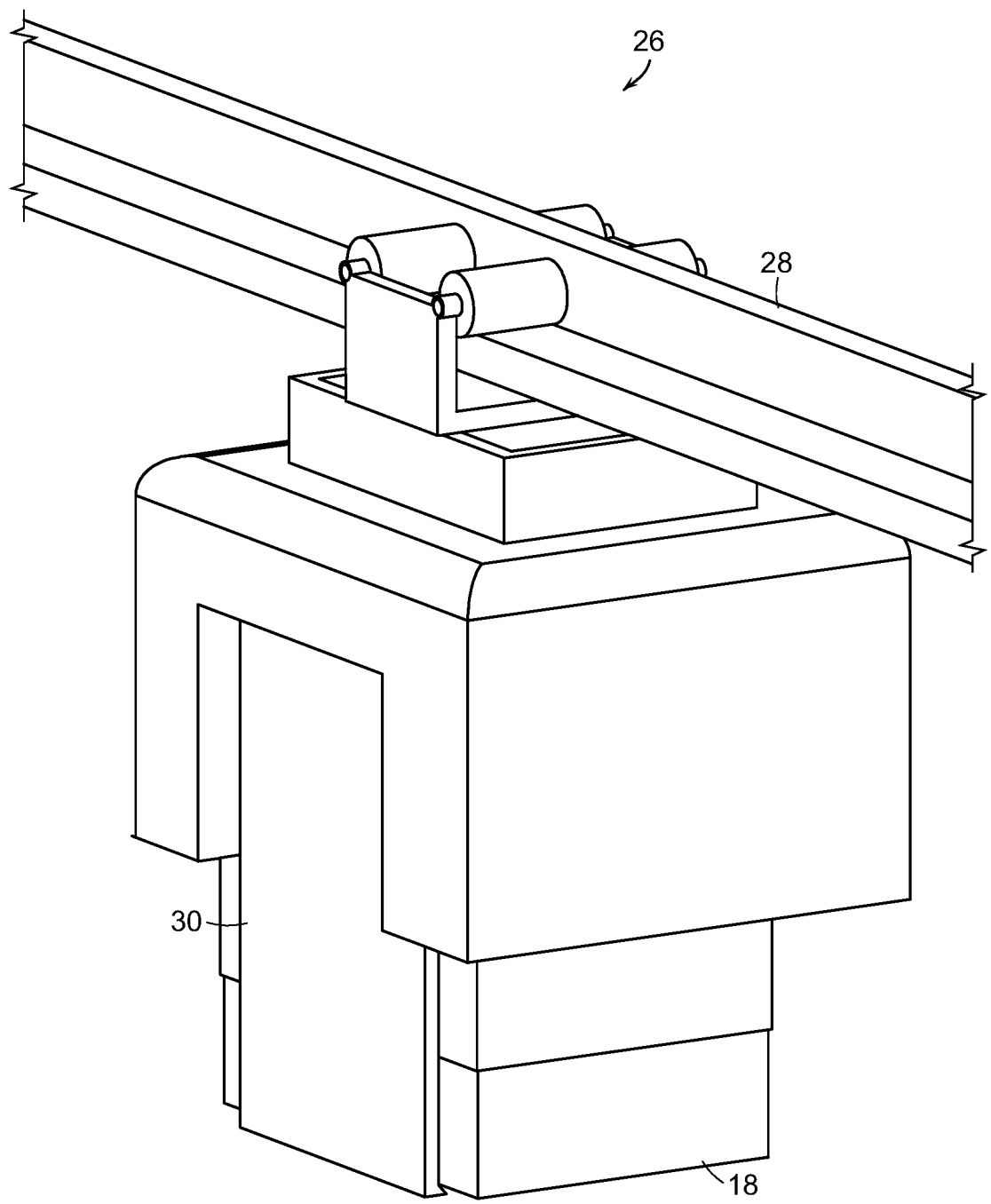

FIG. 2 shows the storage programmable motion device 24 that includes and is mounted from an x-y gantry 23, 25. The destination programmable motion device 26 may be the same as device 24 and similarly include the same x-y gantry 23, 25. The x-y gantry provides that a grasping mechanism 30 the device (24, 26), may be moved in X and Y direction (horizontally) so that all bins within the section may be readily accessed by the grasping mechanism 30 of the device (24, 26). FIG. 3A shows the grasping mechanism 30 of the device 24 grasping a storage bin 14, and FIG. 3B shows the grasping mechanism 30 of the device 26 grasping a destination bin 18. The grasping device may, for example, move the clamp walls away from each other when being lowered over a bin, then bring the clamp walls close to each other to grasp a bin. Releasing a bin would involve moving the clamp walls away from each other.

Figure 4:
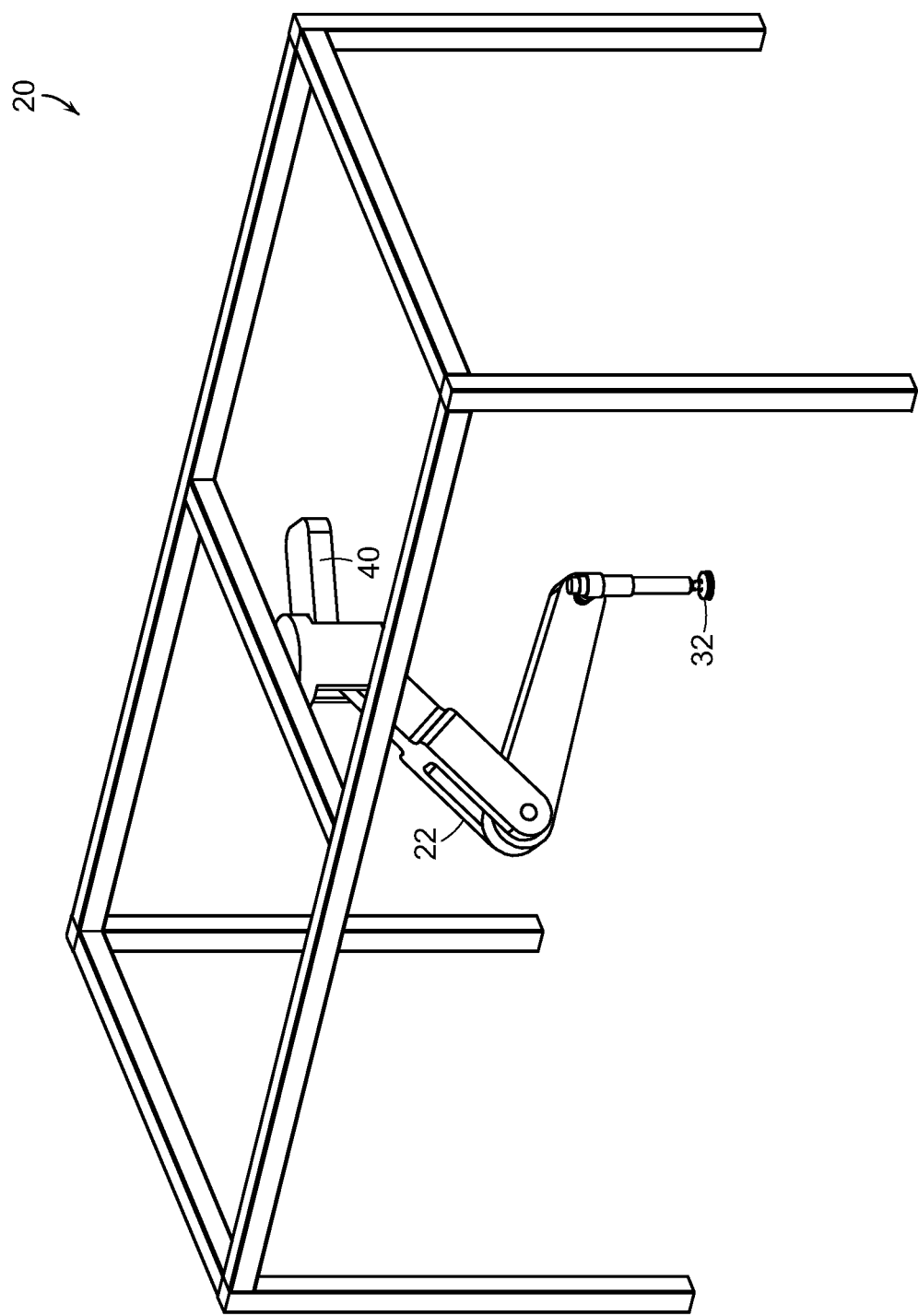
FIG. 4 shows an illustrative diagrammatic view of processing programmable motion device for use in a system of FIG. 1.
Figure 5:
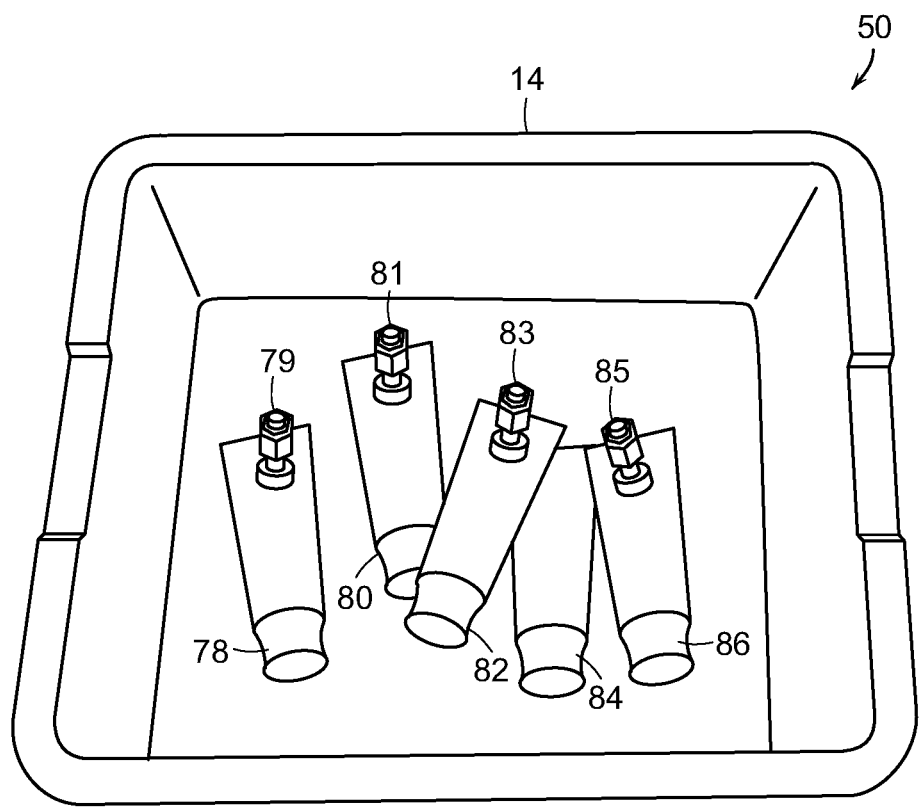
FIG. 5 shows an illustrative diagrammatic view from the perception system of FIG. 4, showing a view of objects within a bin of objects to be processed.

FIG. 4 shows the processing station 20, which includes the processing programmable motion device 22 (e.g., an articulated arm) having an end effector 32. The processing station also includes a perception unit 40 for providing perception data (e.g., camera images or scanning data) regarding the bins 14, 18, and in particular, regarding the contents of the storage bins 14. Since the system places the bins 14, 18 at the processing station, the system will know the locations of the bins. The processing system however, should determine proper grasp locations of the objects in the bin(s) 14. FIG. 5 shows an image view 50 of the bin 14 from the perception unit 40. The image view shows the bin 14, and the bin 14 contains objects 78, 80, 82, 84 and 86. In the present embodiment, the objects are homogenous, and are intended for distribution to different distribution packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp location 81 does not because its associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location as shown in FIG. 5. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, it will either fail to acquire the object due to a bad grasp point where a vacuum seal will not occur, or will acquire the object at a grasp location that is very far from the center of mass of the object and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Figure 6A:
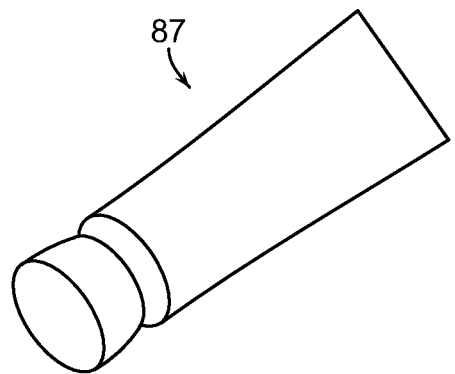
FIGS. 6A and 6B show an illustrative diagrammatic view of a grasp selection process in a storage, retrieval and processing system of the an embodiment of the present invention.
Figure 6B:
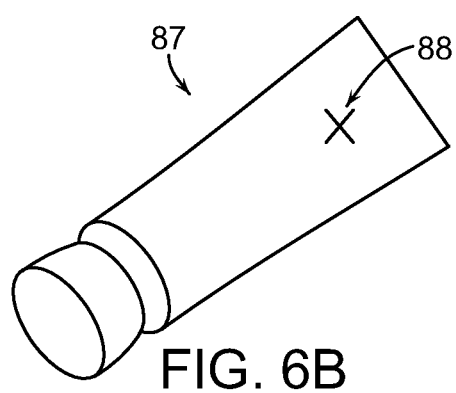

As shown in FIGS. 6A and 6B, the perception system may also identify portions of an object that are the most flat in the generation of good grasp location information. In particular, if an object includes a tubular end and a flat end such as object 87, the system would identify the more flat end as shown at 88 in FIG. 6B. Additionally, the system may select the area of an object where a UPC code appears, as such codes are often printed on a relatively flat portion of the object to facilitate scanning of the barcode.

Figure 7A:
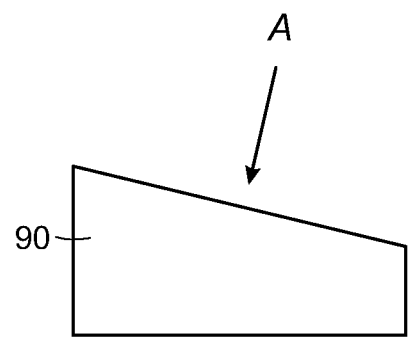
FIGS. 7A and 7B show an illustrative diagrammatic view of a grasp planning process in a storage, retrieval and processing system of the an embodiment of the present invention.
Figure 7B:
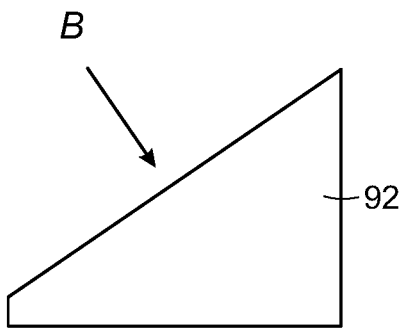
Figure 8A:
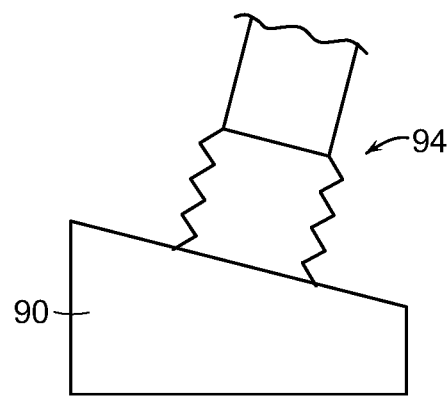
FIGS. 8A and 8B show an illustrative diagrammatic view of a grasp execution process in a storage, retrieval and processing system of the an embodiment of the present invention.
Figure 8B:
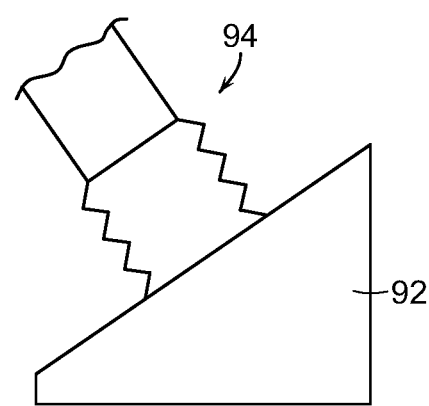

FIGS. 7A and 7B show that for each object 90, 92, the grasp selection system may determine a direction that is normal to the selected flat portion of the object 90, 92 as shown at A and B. As shown in FIGS. 8A and 8B, the robotic system will then direct the end effector 94 to approach each object 90, 92 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

The invention provides therefore in certain embodiments that grasp optimization may be based on determination of surface normal, i.e., moving the end effector to be normal to the perceived surface of the object (as opposed to vertical picks), and that such grasp points may be chosen using fiducial features as grasp points, such as picking on a barcode, given that barcodes are almost always applied to a flat spot on the object.

Figure 9:
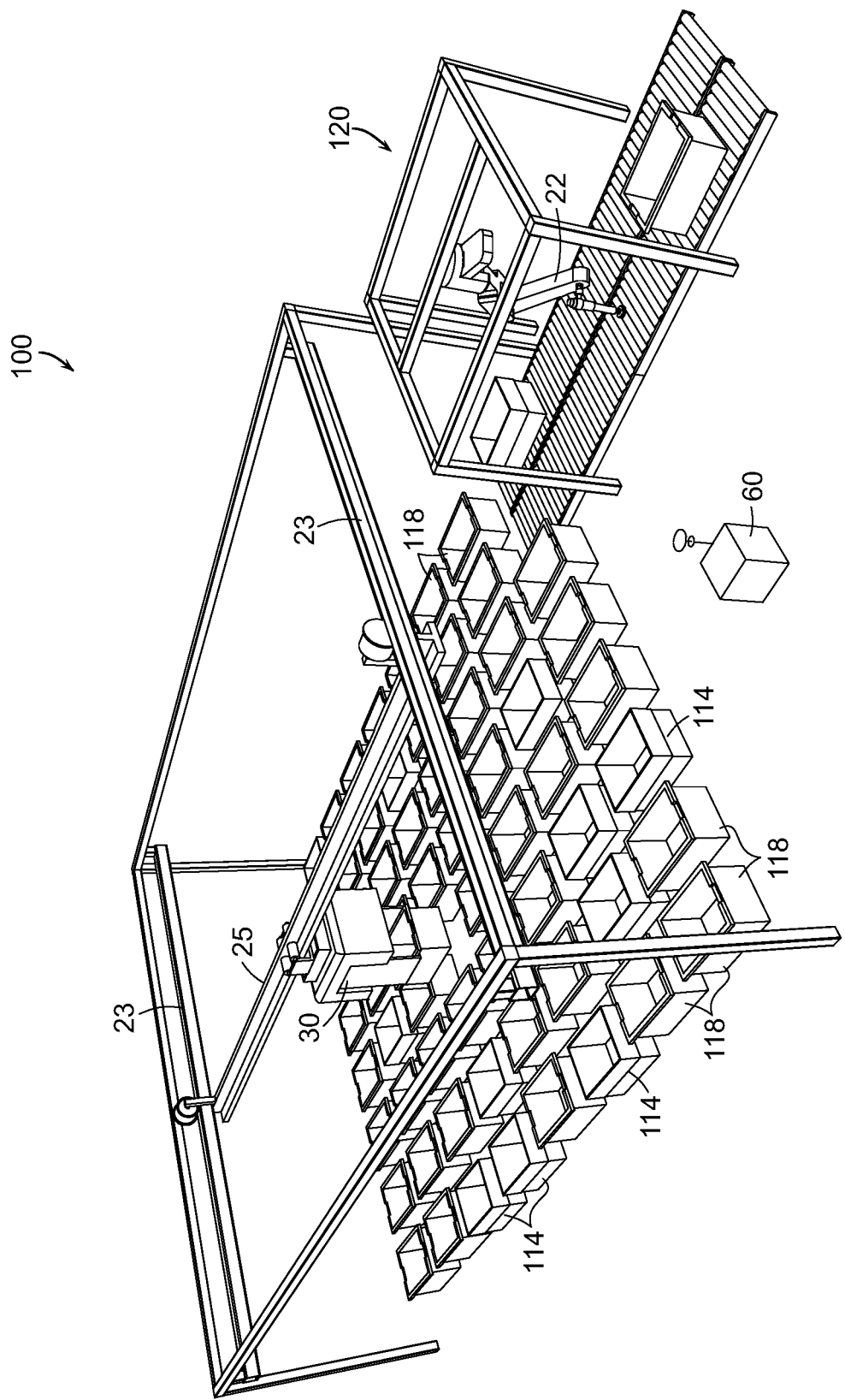
FIG. 9 shows an illustrative diagrammatic view of a storage, retrieval and processing system in accordance with another embodiment of the present invention employing a single common gantry system.

With reference to FIG. 9, in accordance with a further embodiment, the invention provides system 100 that may similarly include a storage section for storing a plurality of storage bins 114, a destination section for maintaining a plurality of destination bins 118, and a processing section 120 that includes a programmable motion device 122. Note that the storage section is mingled with the destination section, such that the storage bins 114 are mingled with the destination bins 118. Any location, in fact, may change fluidly during processing, providing that the system may use any location for either a storage bin 114 or a destination bin 118 as bins are processed. The system also includes a common programmable motion device 124 for moving storage bins 114 to and from the processing station 120, and for moving destination bins 118 to and from the processing section 120 using, for example, either of the grasping mechanisms of FIG. 3A or 3B as may be best suited for the bins.

Both the storage programmable device 124 and the destination programmable motion device 126 are provided with a single common gantry system 128, permitting each grasping mechanism 130 to access all bins 114, 118. In the system 100 of FIG. 9, in fact, there is no requirement that the bins 114, 118 be maintained in physically separate areas as they may be comingled. This is also true of the systems 10, 200 and 300. In this case the storage section may be discontinuous and include the places where storage bins are located, and the destination section may be discontinuous and include the places where destination bins are located. If the bins were fully intermingled, each section would have a checkerboard-like composition.

Again, one or a small number of storage bins 114 are provided to the processing section 120, and one or a small number of destination bins 118 are provided to the processing section 120. The processing programmable motion device 122 (e.g., a robotic articulated arm) then distributes objects from the retrieved storage bins to the retrieved destination bins. The programmable motion device 120 is programmed to retrieve objects from the selected storage bin(s), and provide them to destination bins 122 in accordance with a manifest. Following processing, the returned storage bin(s) may be returned anywhere in the storage section as long as the system knows where each bin has been returned, and the returned destination bin(s) may be returned anywhere in the storage section as long as the system knows where each bin has been returned. Once a destination bin is completely processed, the bin may be placed on an output conveyor or output staging area, or placed on a floor pallet for shipment.

Figure 10:
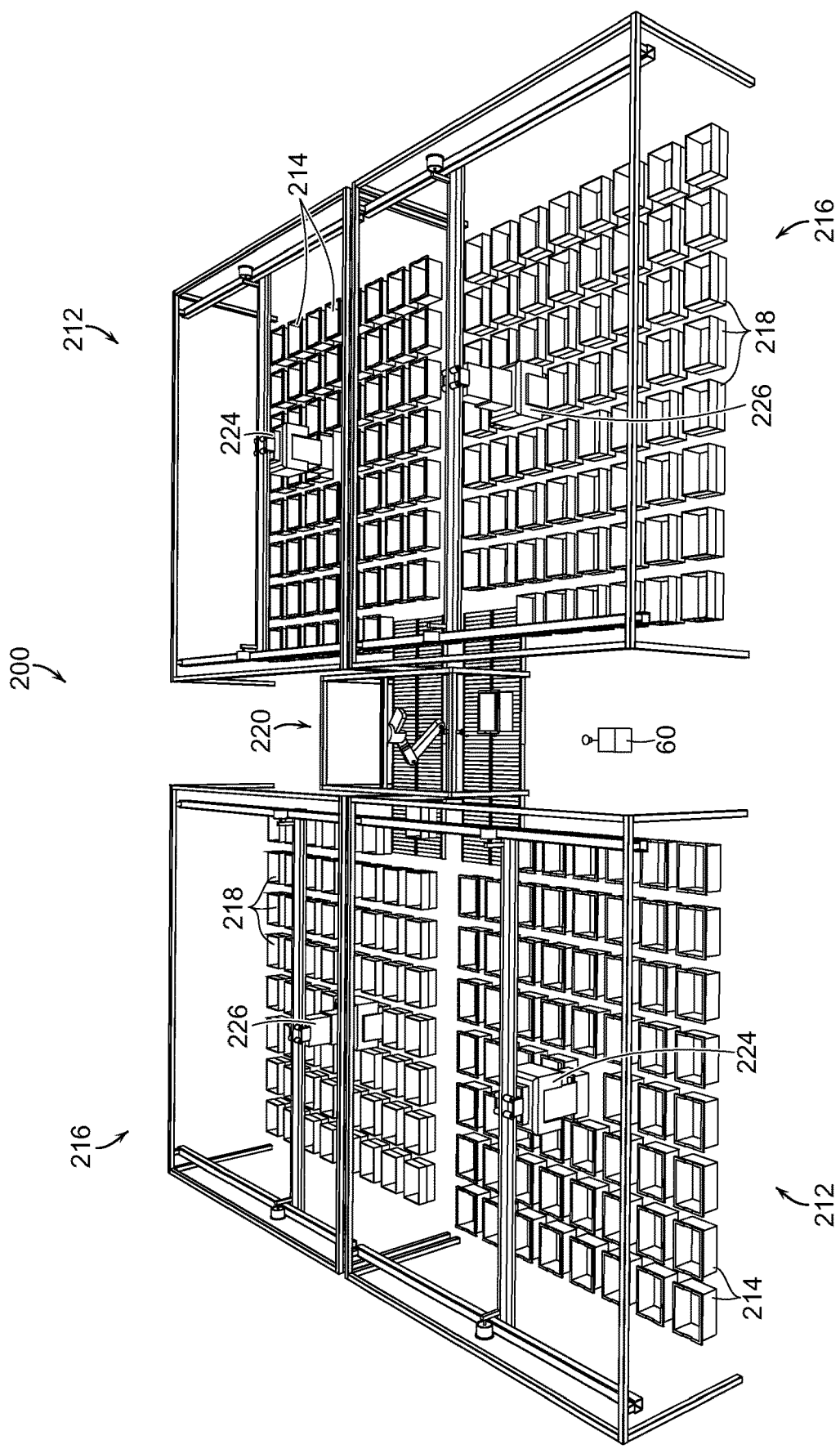
FIG. 10 shows an illustrative diagrammatic view of a storage, retrieval and processing system in accordance with a further embodiment of the present invention employing a processing station between arrays of storages bins and processing bins.

With reference to FIG. 10, in accordance with a further embodiment, the invention provides a system 200 that may include a pair of storage sections 212 for storing a plurality of storage bins 214, a pair of destination sections 216 for maintaining a plurality of destination bins 218, and a common processing section 220 that includes a programmable motion device 222. Each storage section 212 also includes a storage programmable motion device 224 for moving storage bins 214 to and from the processing station 220, and each destination section 216 includes a destination programmable motion device 226 for moving destination bins 218 to and from the processing section 220. The operation of the system is the same as that of the system of FIG. 9, except that the processing section 220 is able to receive bins 214, 218 from a plurality of sources.

Figure 11:
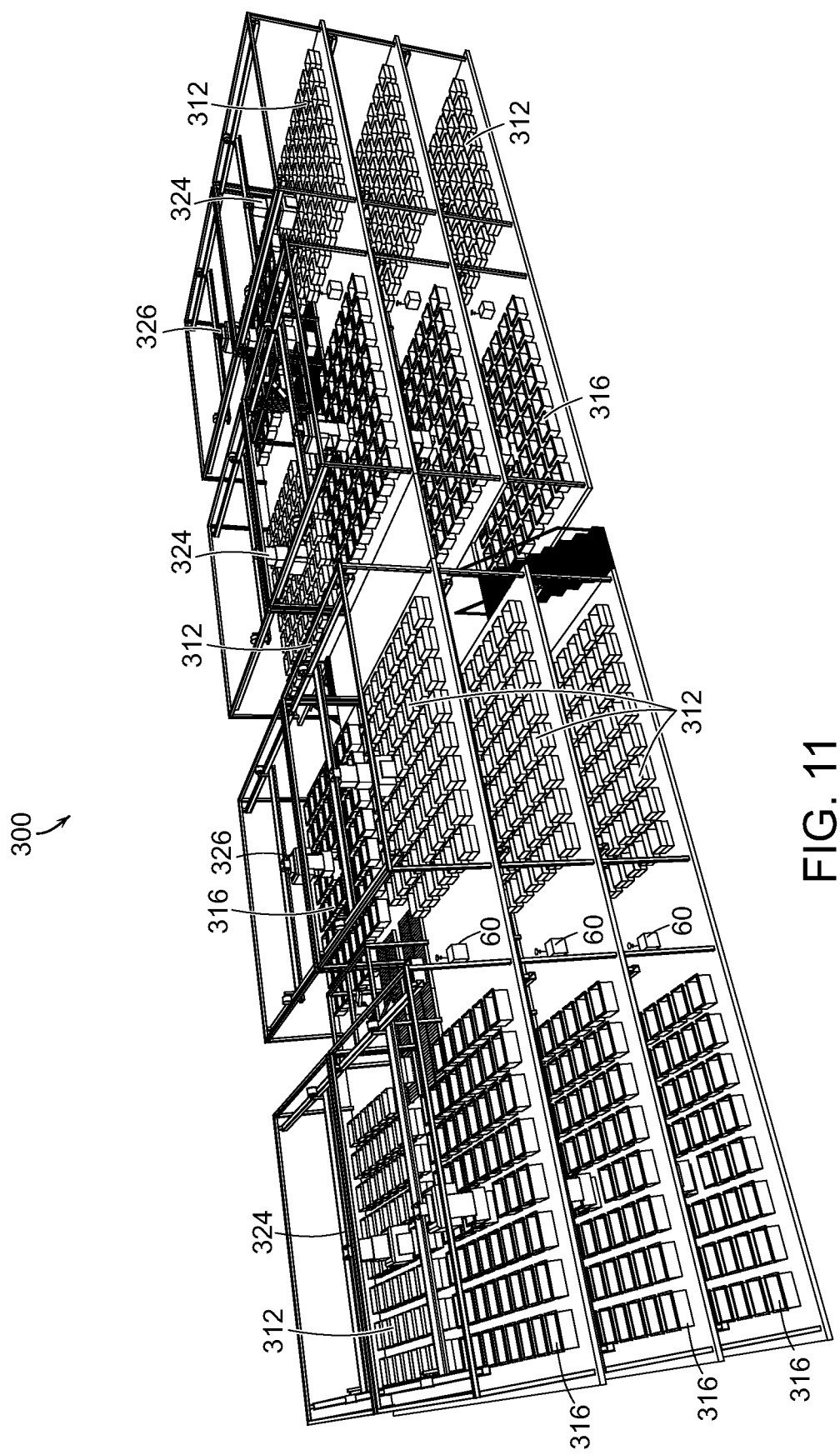
FIG. 11 shows an illustrative diagrammatic view of a storage, retrieval and processing system in accordance with a further embodiment of the present invention employing multiple floors of systems as shown in FIG. 10.

FIG. 11 shows a system 300 in accordance with a further embodiment of the invention that includes many storage sections 312 for storing a plurality of storage bins 314, many destination sections 316 for maintaining a plurality of destination bins 318, and many processing sections 320 that each include a programmable motion device 322. Each storage section 312 may also be accessed by multiple storage programmable motion devices 324 for moving storage bins 214 to and from the processing stations 320, and each destination section 316 may be accessed by multiple destination programmable motion devices 326 for moving destination bins 318 to and from the processing sections 320. The operation of the system is the same as that of the system of FIG. 9, except that the processing sections 320 are able to receive bins 314, 318 from many sources on a floor, and there may be many such floors.

Control of each of the systems 10, 100, 200, 300 may be provided by one or more computer systems 60 that is/are in communication with the storage programmable motion devices, the destination programmable motion devices, and the processing programmable motion devices. The computer system 60 also contains the knowledge (continuously updated) of the location and identity of each of the storage bins, and contains the knowledge (also continuously updated) of the location and identity of each of the destination bins. The system therefore, directs the movement of the storage bins and the destination bins, and retrieves objects from the storage bins, and distributes the objects to the destination bins in accordance with an overall manifest that dictates which objects must be provided in which destination boxes for shipment, for example, to distribution or retail locations.

Those skilled in the art will appreciate that numerous modifications and variations may be made to the above disclosed embodiments without departing from the spirit and scope of the present invention.

What is claimed is:
1. A method of providing storage, retrieval and processing of objects, said method comprising:
retrieving and carrying a storage bin with a storage bin retrieval conveyance system that includes a storage gantry and a storage retrieval gantry device thereon, the storage bin being provided as one or a plurality of storage bins proximate the storage bin retrieval conveyance system;

retrieving and carrying a destination bin with a destination bin retrieval conveyance system that includes a destination gantry and a destination gantry device thereon, the destination bin being provided as one of a plurality of destination bins proximate the storage bin retrieval conveyance system;

providing a bin processing location, wherein the storage retrieval gantry device is positionable over the bin processing location to provide the storage bin to the bin processing location, and wherein the destination gantry device is positionable over the bin processing location to provide the destination bin to the bin processing location; and grasping and moving an object out of the storage bin and to the destination bin using a programmable motion device that includes an end effector for grasping and moving the object.

2. The method as claimed in claim 1, wherein the plurality of storage bins is provided as an array of storage bins at a storage bin holding location.

3. The method claimed in claim 1, wherein the programmable motion device includes an articulated arm to which the end effector is attached.

4. The method as claimed in claim 1, wherein the plurality of destination bins is provided as an array of destination bins at a destination bin holding location.

5. The method as claimed in claim 1, wherein the programmable motion device is positioned adjacent the plurality of storage bins and the plurality of destination bins.

6. The method as claimed in claim 1, wherein the programmable motion device is positioned between the plurality of storage bins and the plurality of destination bins.

7. The method as claimed in claim 1, wherein the method further includes providing a completed destination bin to an output conveyor.

8. The method as claimed in claim 1, wherein the programmable motion device is positioned between a plurality of arrays of storage bins and a plurality of arrays of destination bins.

9. The method as claimed in claim 8, wherein the programmable motion device is one of a plurality of programmable motion devices, at least one of said plurality of programmable motion devices being provided on each of a plurality of processing floors.

10. The method as claimed in claim 9, wherein the plurality of processing floors are stacked.

11. A method of providing storage, retrieval and processing of objects, said method comprising:

retrieving and carrying a selected storage bin of a plurality of storage bins and destination bins from a bin area with a bin conveyance system that includes a gantry and a gantry device, said plurality of storage bins and destination bins being provided proximate the retrieval conveyance system;

retrieving and carrying a destination bin of the plurality of storage bins and destination bins from the bin area with the bin conveyance system that includes the gantry and the gantry device;

a processing programmable motion device in communication with the storage bin processing location for receiving the selected storage bin from the plurality of storage bins, said processing programmable motion device including an end effector for grasping and moving a selected object out of the selected storage bin;

providing a bin processing location, wherein the gantry device is positionable over the bin processing location to provide the storage bin to the bin processing location, and wherein the gantry device is positionable over the bin processing location to provide the destination bin to the bin processing location; and grasping and moving an object out of the selected storage bin and to the destination bin using a programmable motion device that includes an end effector for grasping and moving the object.

12. The method as claimed in claim 11, wherein the plurality of storage bins and the plurality of destination bins are provided as an array of bins.

13. The method as claimed in claim 11, wherein the plurality of storage bins and the plurality of destination bins are provided as a plurality of arrays of bins.

14. The method claimed in claim 11, wherein the programmable motion device includes an articulated arm to which the end effector is attached.

15. The method as claimed in claim 11, wherein the programmable motion device is positioned adjacent the plurality of storage bins and destination bins.

16. The method as claimed in claim 11, wherein the method further includes providing a completed destination bin to an output conveyor.

17. The method as claimed in claim 11, wherein the programmable motion device is positioned between a plurality of arrays of storage bins and destination bins.

18. The method as claimed in claim 17, wherein the programmable motion device is one of a plurality of programmable motion devices, at least one of said plurality of programmable motion devices being provided on each of a plurality of processing floors.

19. The method as claimed in claim 18, wherein the plurality of processing floors are stacked.

20. A method of providing storage, retrieval and processing of objects, said method comprising:

providing a plurality of storage bins for storing a plurality of objects, said plurality of storage bins being in communication with a gantry retrieval conveyance system;

conveying a selected storage bin from a first location of the plurality of storage bins to a location proximate a programmable motion device with the gantry retrieval conveyance system;

receiving proximate the programmable motion device a selected destination bin from a plurality of destination bins;

grasping a selected object out of the selected storage bin with the programmable motion device and moving the selected object to the selected destination bin; and returning the storage bin to a second location of the plurality of storage bins.

21. The method as claimed in claim 20, wherein the plurality of storage bins is provided in at least one linear arrangement accessible by the gantry retrieval conveyance system, and wherein the method further includes the step of lifting a selected bin.

22. The method as claimed in claim 20, wherein the gantry retrieval conveyance system is also adapted to bring the selected destination bin back to the plurality of destination bins.

23. The method as claimed in claim 20, wherein the plurality of storage bins and the plurality of destination bins are provided as an array of bins.

24. The method as claimed in claim 20, wherein the plurality of storage bins and the plurality of destination bins are provided as a plurality of arrays of bins.

25. The method claimed in claim 20, wherein the programmable motion device includes an articulated arm to which the end effector is attached.

26. The method as claimed in claim 20, wherein the programmable motion device is positioned adjacent the plurality of storage bins and the plurality of destination bins.

27. The method as claimed in claim 20, wherein the method further includes providing a completed destination bin to an output conveyor.

28. The method as claimed in claim 20, wherein the gantry retrieval conveyance system returns the selected destination bin to a different location than that from which the selected destination bin had been selected.

29. The method as claimed in claim 28, wherein the different location is a shipment transport location.

30. The method as claimed in claim 20, wherein the programmable motion device is positioned between a plurality of arrays of storage bins and destination bins.

31. The method as claimed in claim 30, wherein the programmable motion device is one of a plurality of programmable motion devices, at least one of said plurality of programmable motion devices being provided on each of a plurality of processing floors.

32. The method as claimed in claim 31, wherein the plurality of processing floors are stacked.

\* \* \* \* \*

UNITED STATES PATENT AND TRADEMARK OFFICE
CERTIFICATE OF CORRECTION

PATENT NO. : 11,478,923 B2
APPLICATION NO. : 16/808600
DATED : October 25, 2022
INVENTOR(S) : Thomas Wagner et al.

It is certified that error appears in the above-identified patent and that said Letters Patent is hereby corrected as shown below:

In the Specification

In Column 1, Line 21, should read:
"ally include computer-controlled systems for automatically"

In Column 2, Line 58, should read:
"processing system of an embodiment of the present"

In Column 2, Line 62, should read:
"processing system of an embodiment of the present"

In Column 2, Line 66, should read:
"processing system of an embodiment of the present"

In Column 4, Lines 3-4, should read:
"...The X-Y gantry provides that a grasping ... may be moved in X and Y directions"

In Column 5, Line 20, should read:
"The invention provides therefore, in certain embodiments"

In Column 5, Line 29, should read:
"embodiment, the invention provides a system 100 that may"

Signed and Sealed this
Seventeenth Day of January, 2023

*Katherine Kelly Vidal*
Katherine Kelly Vidal
*Director of the United States Patent and Trademark Office*